(12) United States Patent
Meng

(10) Patent No.: US 9,695,315 B1
(45) Date of Patent: Jul. 4, 2017

(54) MODIFIED COMPUTER SILICON RUBBER PROTECTION SHELL AND MANUFACTURING METHODS

(71) Applicant: Juanhui Meng, Guangxi (CN)

(72) Inventor: Juanhui Meng, Guangxi (CN)

( * ) Notice: Subject to any disclaimer, the term of this patent is extended or adjusted under 35 U.S.C. 154(b) by 0 days.

(21) Appl. No.: 14/971,648

(22) Filed: Dec. 16, 2015

(51) Int. Cl.
  *C08L 69/00* (2006.01)
  *B29C 45/00* (2006.01)
  *B29K 21/00* (2006.01)
  *B29K 69/00* (2006.01)
  *B29K 509/08* (2006.01)
  *B29K 509/04* (2006.01)
  *B29L 9/00* (2006.01)

(52) U.S. Cl.
  CPC .......... *C08L 69/00* (2013.01); *B29C 45/0003* (2013.01); *B29K 2021/003* (2013.01); *B29K 2069/00* (2013.01); *B29K 2509/04* (2013.01); *B29K 2509/08* (2013.01); *B29L 2009/00* (2013.01); *C08L 2205/035* (2013.01); *C08L 2205/06* (2013.01)

(58) Field of Classification Search
  CPC .............................. B29C 45/0003; C08L 69/00
  USPC .......................... 523/218; 524/397, 440, 443
  See application file for complete search history.

(56) References Cited

U.S. PATENT DOCUMENTS 4,891,399 A * 1/1990 Ohkawa ................... C08K 3/22
  523/200
4,980,086 A * 12/1990 Hiraiwa ................. C08F 22/32
  252/500

* cited by examiner

*Primary Examiner* — Edward Cain

(57) ABSTRACT

The present invention relates to a modified computer silicon rubber protection shell and its manufacturing methods, comprising: 100 to 120 parts of polycarbonate, 10 to 12 parts of anion-carried capsule mesoporous silica microsphere, 10 to 12 parts of sodium polyacrylate, 20 to 30 parts of modified tackifying resin micro powder, 10 to 12 parts of colored gel, 6 to 8 parts of silicon nitride micro powder, 5.5 to 6.5 parts of fiberglass, 5 to 7 parts of nano-biomass silica hydrated micro powder, 2.8 to 4.8 parts of sodium succinate, 20 to 30 parts of organic super-dissolving silica gel micro powder in which the weight percentage of nano platinum contained is 15%, 20 to 30 parts of 50-degrees-hardness methylvinyl silicon rubber, and the right amount of deionized water.

2 Claims, No Drawings

MODIFIED COMPUTER SILICON RUBBER PROTECTION SHELL AND MANUFACTURING METHODS

BACKGROUND

Field

The present invention relates to the technical field of silicon rubber protection shell, and more particularly, to a modified computer silicon rubber protection shell and the manufacturing methods.

Description of Related Art

High performance silicone rubber is a kind of organic polymer material with advantages of high elasticity, heat-and-cold resistance, weather resistance, ozone and UV resistance, radiation resistance, electrical insulation, physiological inertia and high permeability. It can be widely used in various industries including aerospace, electrical and electronic, machinery, chemical industry, building materials, and health care as well as in daily life. The silicon rubber industry has developed very rapidly in recent years. Presently, high performance silicon rubber is heavily used in the fields of building, sealing, electrical, electronic, and automobiles. In the near future, automobile, electrical and electronic likely will replace the construction and building to become the main consumer market. Although mechanical properties, stability, adhesiveness, thermal and electrical properties of silicon rubber have always been the focus of the market, the concern of surrounding environment and self-health status has been increased drastically. As a result, there is an increased emphasis on the environmental performance of the high performance silicon rubber.

SUMMARY OF THE INVENTION

The present invention provides a modified computer silicon rubber protection shell and the manufacturing methods for meeting the development demands of high performance eco-friendly silicon rubber.

In order to achieve the objectives above, the technical solution adopted in the disclosure, comprising:

A modified computer silicon rubber protection shell, comprising the following components in parts by weight: 100 to 120 parts of polycarbonate, 10 to 12 parts of anion-carried capsule mesoporous silica microsphere, 10 to 12 parts of sodium polyacrylate, 20 to 30 parts of modified tackifying resin micro powder, 10 to 12 parts of colored gel, 6 to 8 parts of silicon nitride micro powder, 5.5 to 6.5 parts of fiberglass, 5 to 7 parts of nano-biomass silica hydrated micro powder, 2.8 to 4.8 parts of sodium succinate, 20 to 30 parts of organic super-dissolving silica gel micro powder in which the weight percentage of nano platinum contained is 15%, 20 to 30 parts of 50-degrees-hardness methylvinyl silicon rubber, and the right amount of deionized water.

A method of manufacturing the modified computer silicon rubber protection shell, comprising the following steps:

Mixing polycarbonate or 90% of polycarbonate with colored gel to get a mixture, then mix the mixture with 75% of anion-carried capsule mesoporous silica microsphere, silicon nitride micro powder and nano-biomass silica hydrated micro powder; grind the mixer in the ultrafine grinder for 30 to 40 minutes; afterwards, feed into the injection molding machine along with modified tackifying resin micro powder, sodium polyacrylate and deionized water which is 0.4 to 0.6 times of the total weight; stir under the temperature of 130-140° C. for 10 minutes then adopt injection molding method to get the eco-friendly bottom shell for preparation of the next step;

Cooling the eco-friendly bottom shell, then place into the prepared mold and assembly the mold to the injection molding machine for preparation of the next step;

Grinding the 50-degrees-hardness methylvinyl silicon rubber and fiberglass in the ultrafine grinder for 15 to 25 minutes, then feed into injection molding machine along with 25% of anion-carried capsule mesoporous silica microsphere, organic super-dissolving silica gel micro powder in which the weight percentage of nano platinum contained is 15%, sodium succinate and deionized water which is 0.2 to 0.4 times of the total weight, afterwards, stir under the temperature of 110° C. for 10 to 20 minutes then directly heat-inject on the surface of the eco-friendly bottom shell placed in the mold above. After cooling, the protection shell of the invention can be achieved.

The advantages of the invention: The invention combines polycarbonate, methyl vinyl silicone rubber and organic super-dissolving silica gel micro powder in which the weight percentage of nano platinum contained is 15% to manufacture the computer protection shell through bottom shell and internal surface injection molding, which has advantages of good mechanical property and conductivity.

Meanwhile, adding anion-carried capsule mesoporous silica microsphere in the manufacturing process can further improve the protective function of the protection shells, as well as enhancing the function of environmental protection; adding colored gel can enable the color-control of the protection shells; adding silicon nitride micro powder, fiberglass and nano-biomass silica hydrated micro powder can help to improve the hardness, compressive capacity and environmental safety of the protection shells.

DETAILED DESCRIPTION

The technical solution adopted in the invention can be further detailed by the following embodiments.

Embodiment 1

A modified computer silicon rubber protection shell, comprising the following components in parts by weight: 100 parts of polycarbonate, 10 parts of anion-carried capsule mesoporous silica microsphere, 10 parts of sodium polyacrylate, 20 parts of modified tackifying resin micro powder, 10 parts of colored gel, 6 parts of silicon nitride micro powder, 6.5 parts of fiberglass, 5 parts of nano-biomass silica hydrated micro powder, 4.8 parts of sodium succinate, 30 parts of organic super-dissolving silica gel micro powder in which the weight percentage of nano platinum contained is 15%, 30 parts of 50-degrees-hardness methylvinyl silicon rubber, and the right amount of deionized water.

A method of manufacturing the modified computer silicon rubber protection shell, comprising the following steps:

Mixing polycarbonate with 75% of anion-carried capsule mesoporous silica microsphere, silicon nitride micro powder and nano-biomass silica hydrated micro powder, then grind the mixer in the ultrafine grinder for 30 minutes, afterwards, feed into the injection molding machine along with modified tackifying resin micro powder, sodium polyacrylate and deionized water which 0.5 times of the total weight, stir under the temperature of 130° C. for 10 minutes, then adopt injection molding method to get the eco-friendly bottom shell for preparation of the next step;

Cooling the eco-friendly bottom shell, then place into the prepared mold and assembly the mold to the injection molding machine for preparation of the next step;

Grinding the 50-degrees-hardness methylvinyl silicon rubber and fiberglass in the ultrafine grinder for 15 minutes, then feed into injection molding machine along with 25% of anion-carried capsule mesoporous silica microsphere, organic super-dissolving silica gel micro powder in which the weight percentage of nano platinum contained is 15%, sodium succinate and deionized water which is 0.2 times of the total weight, afterwards, stir under the temperature of 110° C. for 10 minutes then directly heat-inject on the surface of the eco-friendly bottom shell placed in the mold above. After cooling, the protection shell of the invention can be achieved.

Embodiment 2

A modified computer silicon rubber protection shell, comprising the following components in parts by weight: 110 parts of polycarbonate, 11 parts of anion-carried capsule mesoporous silica microsphere, 11 parts of sodium polyacrylate, 25 parts of modified tackifying resin micro powder, 11 parts of colored gel, 7 parts of silicon nitride micro powder, 6 parts of fiberglass, 6 parts of nano-biomass silica hydrated micro powder, 3.8 parts of sodium succinate, 25 parts of organic super-dissolving silica gel micro powder in which the weight percentage of nano platinum contained is 15%, 25 parts of 50-degrees-hardness methylvinyl silicon rubber, and the right amount of deionized water.

A method of manufacturing the modified computer silicon rubber protection shell, comprising the following steps:

Mixing 90% of polycarbonate with colored gel to get mixer, then mix the mixer with 75% of anion-carried capsule mesoporous silica microsphere, silicon nitride micro powder and nano-biomass silica hydrated micro powder; grind the mixer in the ultrafine grinder for 35 minutes, afterwards, feed into the injection molding machine along with modified tackifying resin micro powder, sodium polyacrylate and deionized water which is 0.5 times of the total weight, stir under the temperature of 135° C. for 10 minutes then adopt injection molding method to get the eco-friendly bottom shell for preparation of the next step;

Cooling the eco-friendly bottom shell, then place into the prepared mold and assembly the mold to the injection molding machine for preparation of the next step;

Grinding the 50-degrees-hardness methylvinyl silicon rubber and fiberglass in the ultrafine grinder for 20 minutes, then feed into injection molding machine along with 25% of anion-carried capsule mesoporous silica microsphere, organic super-dissolving silica gel micro powder in which the weight percentage of nano platinum contained is 15%, sodium succinate and deionized water which is 0.3 times of the total weight, afterwards, stir under the temperature of 110° C. for 15 minutes, then directly heat-inject on the surface of the eco-friendly bottom shell placed in the mold above. After cooling, the protection shell of the invention can be achieved.

Embodiment 3

A modified computer silicon rubber protection shell, comprising the following components in parts by weight: 120 parts of polycarbonate, 12 parts of anion-carried capsule mesoporous silica microsphere, 12 parts of sodium polyacrylate, 30 parts of modified tackifying resin micro powder, 12 parts of colored gel, 8 parts of silicon nitride micro powder, 5.5 parts of fiberglass, 7 parts of nano-biomass silica hydrated micro powder, 2.8 parts of sodium succinate, 20 parts of organic super-dissolving silica gel micro powder in which the weight percentage of nano platinum contained is 15%, 20 parts of 50-degrees-hardness methylvinyl silicon rubber, and the right amount of deionized water.

A method of manufacturing the modified computer silicon rubber protection shell, comprising the following steps:

Mixing polycarbonate or 90% of polycarbonate with colored gel to get mixer, then mix the mixer with 75% of anion-carried capsule mesoporous silica microsphere, silicon nitride micro powder and nano-biomass silica hydrated micro powder; grind the mixer in the ultrafine grinder for 40 minutes, afterwards, then feed into the injection molding machine along with modified tackifying resin micro powder, sodium polyacrylate and deionized water which is 0.6 times of the total weight, stir under the temperature of 140° C. for 10 minutes, then adopt injection molding method to get the eco-friendly bottom shell for preparation of the next step;

Cooling the eco-friendly bottom shell, then place into the prepared mold and assembly the mold to the injection molding machine for preparation of the next step;

Grinding the 50-degrees-hardness methylvinyl silicon rubber and fiberglass in the ultrafine grinder for 25 minutes, then feed into injection molding machine along with 25% of anion-carried capsule mesoporous silica microsphere, organic super-dissolving silica gel micro powder in which the weight percentage of nano platinum contained is 15%, sodium succinate and deionized water which is 0.4 times of the total weight, afterwards, stir under the temperature of 110° C. for 20 minutes then directly heat-inject on the surface of the eco-friendly bottom shell placed in the mold above. After cooling, the protection shell of the invention can be achieved.

After testing the main performance parameters of the materials of the computer protection shell in embodiments 1 to 3 of the invention respectively, the testing results are shown in table 1:

TABLE 1

Main Performance Parameters of Embodiments 1-3 of the Invention

| | Embodiment 1 | Embodiment 2 | Embodiment 3 |
|---|---|---|---|
| Hardness (dgrees) | 77 | 88 | 96 |
| Compressive Capacity (kPa) | 212 | 218 | 223 |
| Electromagnetic Radiation Absorption Coefficient | 3.9 | 3.2 | 2.7 |

The invention claimed is:

1. A modified computer silicon rubber protection shell, comprising the following components in parts by weight:
    100 to 120 parts of polycarbonate, 10 to 12 parts of mesoporous silica microsphere, 10 to 12 parts of sodium polyacrylate, 20 to 30 parts of tackifying resin micro powder, 10 to 12 parts of colored gel,
    6 to 8 parts of silicon nitride micro powder, 5.5 to 6.5 parts of fiberglass,
    5 to 7 parts of nano-biomass silica hydrated micro powder, 2.8 to 4.8 parts of sodium succinate, 20 to 30 parts of organic silica gel micro powder wherein the weight percentage of nano platinum contained is 15%, 20 to 30 parts of methylvinyl silicon rubber, and a predetermined amount of deionized water.

2. A method of manufacturing the modified computer silicon rubber protection shell of claim 1, comprising:
   (1) Making a first mixture by mixing polycarbonate or 90% of polycarbonate with colored gel; make a second mixture by mixing the said first mixture with 75% of mesoporous silica microsphere, silicon nitride micro powder and nano-biomass silica hydrated micro powder; grinding the second mixture in the ultrafine grinder for 30 to 40 minutes; disposing the second mixture into the injection molding machine along with tackifying resin micro powder, sodium polyacrylate and deionized water of 40%-60% of total weight, and stirring under the temperature of 130-140° C. for 10 minutes, producing the bottom shell using injection molding method;
   (2) Cooling the bottom shell, and placing the bottom shell into the prepared mold and assembling the mold to the injection molding machine;
   (3) Grinding the mixture of methylvinyl silicon rubber of 50 degree hardness and fiberglass in the ultrafine grinder for 15 to 25 minutes, dispose the said mixture into injection molding machine along with 25% of anion-carried capsule mesoporous silica microsphere, organic silica gel micro powder in which the weight percentage of nano platinum contained is 15%, sodium succinate and deionized water of 20%-40% total weight, stirring under the temperature of 110° C. for 10 to 20 minutes, heat-injecting on the surface of the bottom shell placed in the mold as described in step 2.

* * * * *